Dec. 6, 1955 W. A. HAGERBAUMER 2,726,122
METHOD FOR PNEUMATIC TRANSFER OF GRANULAR CONTACT
MATERIAL IN A MOVING BED CONVERSION
PROCESS AND APPARATUS THEREFOR
Filed May 16, 1951 2 Sheets-Sheet 1
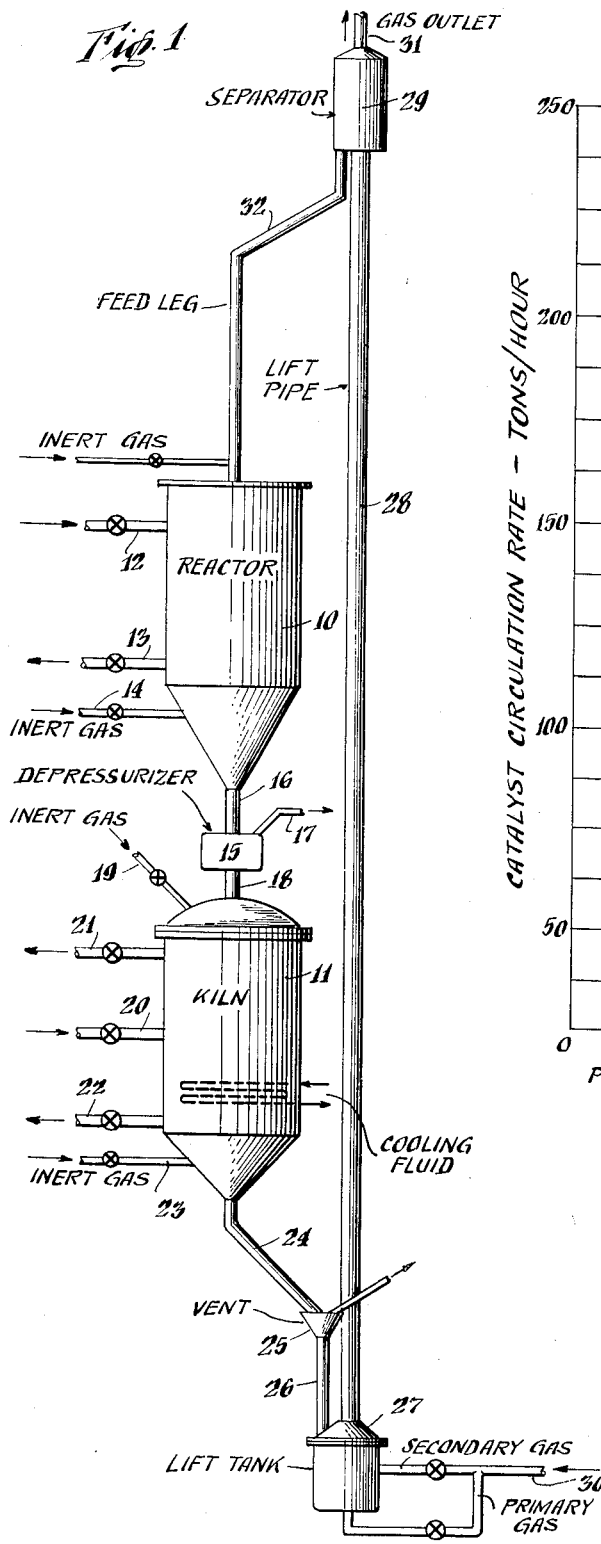
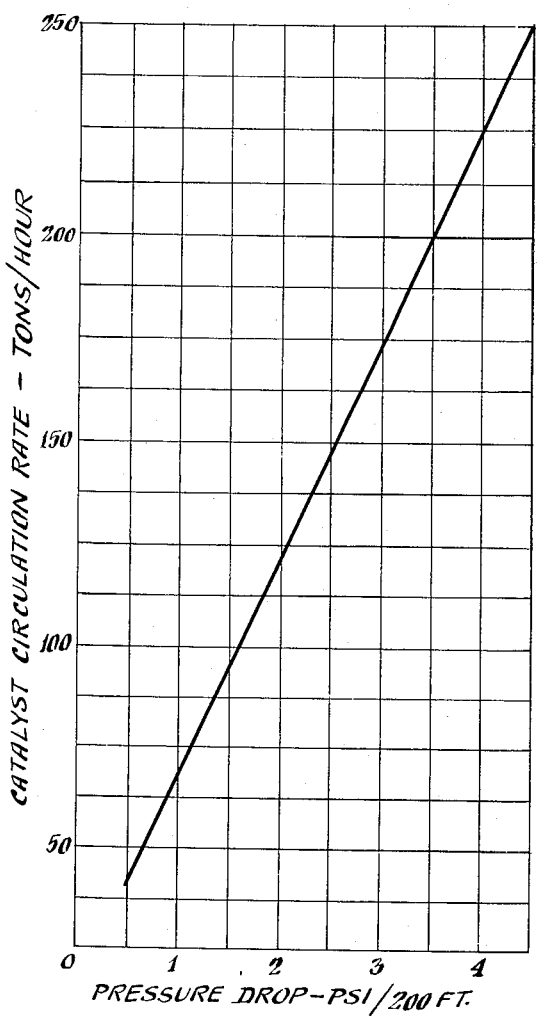
INVENTOR.
William A. Hagerbaumer
BY
Charles L. Huggett
AGENT

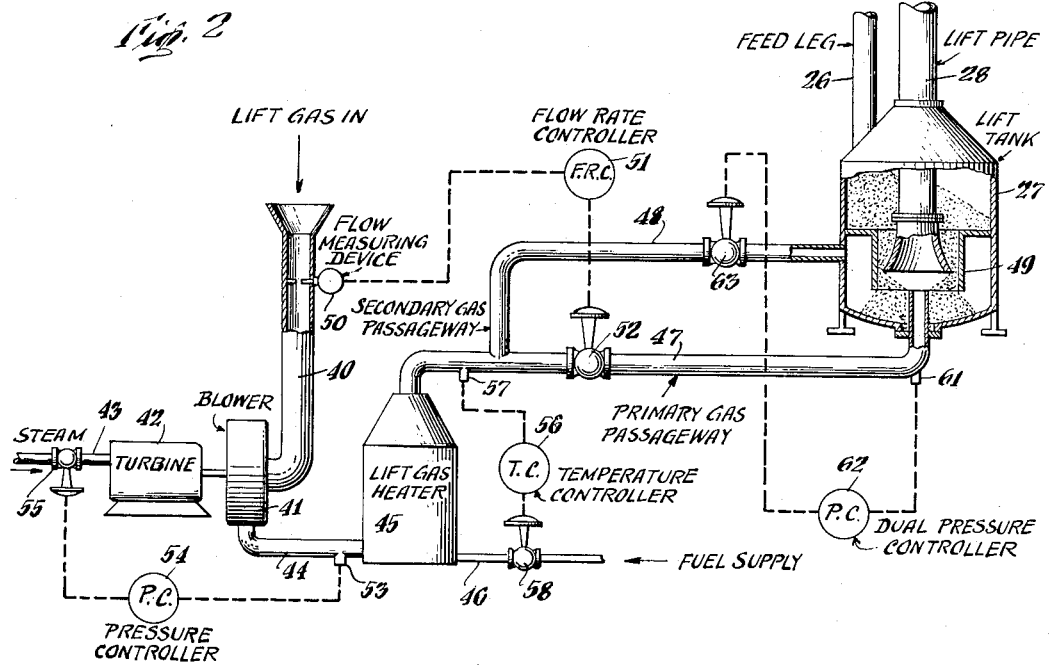
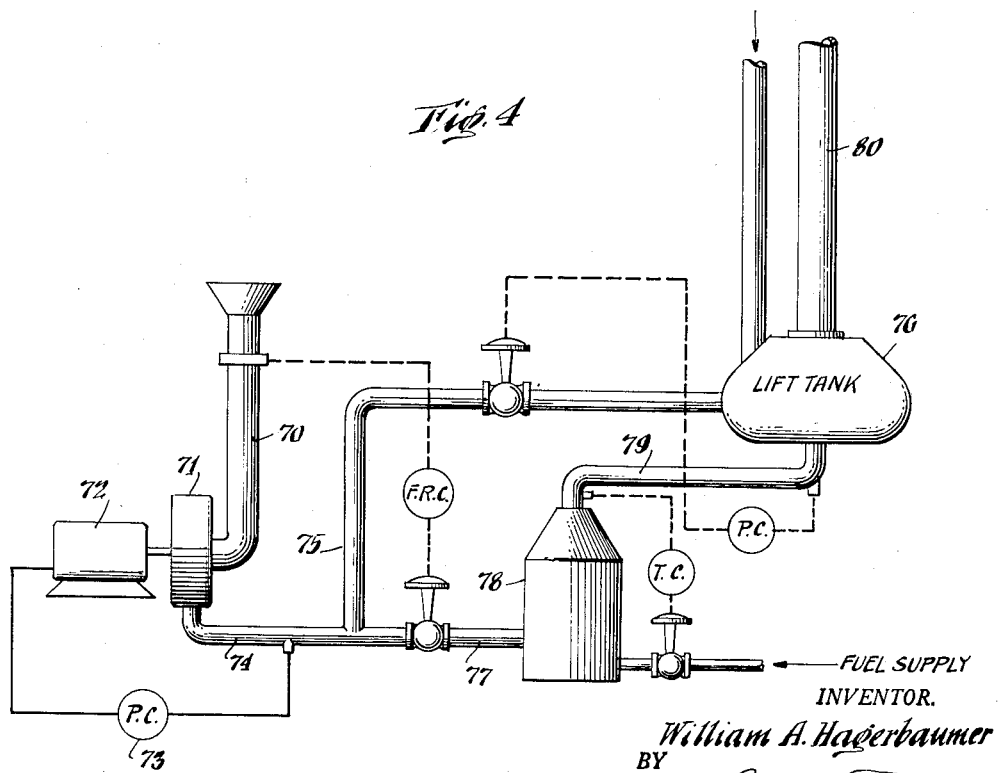

United States Patent Office 2,726,122
Patented Dec. 6, 1955

2,726,122

METHOD FOR PNEUMATIC TRANSFER OF GRANULAR CONTACT MATERIAL IN A MOVING BED CONVERSION PROCESS AND APPARATUS THEREFOR

William A. Hagerbaumer, Westfield, N. J., assignor to Socony Mobil Oil Company, Inc., a corporation of New York Application May 16, 1951, Serial No. 226,646

10 Claims. (Cl. 302—53)

This application pertains to the pneumatic transfer of solid, particle-form material and is particularly directed to an improved apparatus for and method of lifting granular contact material by means of lift gas in a continuous hydrocarbon conversion process.

In the petroleum industry many processes are known in which hydrocarbons, at temperature and pressure suitable for conversion, are contacted with a granular solid material in the form of a gravitating column to produce converted products. While gravitating through the conversion zone, the particles receive a deposit of carbonaceous material or "coke" on their surface. The particles are removed from the bottom of the column to a reconditioning zone where they are contacted with a combustion supporting gas at temperatures high enough to burn off the coke deposits. The reconditioned contact material is returned thereafter, to the top of the column in the conversion zone and reused. Bucket elevators have been used commercially in these systems to continuously raise the contact particles, primarily because of their low attrition rates. Gas lifts have been diligently sought, over the years, as a replacement for the elevators because of certain limitations of commercially available elevators. All prior gas lifts have been unsuccessful for commercial use, however, because they involved high particle attrition or breakage rates.

Examples of various processes in this industry which necessitate the use of granular contact material are polymerization, dehydrogenation, isomerization, alkylation, hydrogenation, reforming, cyclization, desulfurization and catalytic cracking. This invention will be described in relation to a catalytic cracking process, being understood, however, to apply broadly to any process or operation in which it is desired to lift a solid material in particle form with minimum particle attrition and erosion of metal. For example, it may be applied to conversion processes wherein hydrocarbons, prepared for conversion, are brought into contact with inert refractory particles and converted products are removed therefrom. Typical of such processes is the production of ethylene from various gas oils at temperatures in the neighborhood of 1500° F.

In the moving bed system of catalytic cracking, the particles in granular form are contacted with suitably prepared hydrocarbons while gravitating downwardly through a reaction zone in the form of a substantially compact column. The feed stock usually a gas oil boiling somewhat above the gasoline boiling range, cracks in the presence of the hot catalyst, forming substantial amounts of hydrocarbons which do boil in the gasoline boiling range. Coked or spent catalyst is removed continuously from the bottom of the conversion or reaction zone and transferred to the top of a gravitating substantially compact column of particles in a regeneration zone. The catalyst gravitating through the regeneration or reconditioning zone is contacted with a combustion supporting gas, such as air, to burn off the coke deposits from the surface of the catalyst. The coke-free or regenerated catalyst is withdrawn from the bottom of the column in the regeneration zone and transferred to the top of the column in the reaction zone completing the continuous path.

This process involves the use of high temperatures and may involve the use of high pressures. For example, the reaction zone may be maintained at about 800–1100° F., suitable cracking temperature, and the regeneration zone may be maintained at about 1000–1300° F., suitable regeneration temperature. The catalyst is lifted, therefore, at temperatures of approximately 800–1200° F., or thereabouts.

As the catalyst material gravitates through the conversion zone, the gas or vapors contact the catalyst surface by passing through the voids between the particles. It is desirable that the gas be uniformly distributed throughout the bed for a variety of reasons. For example, channelling of the gas through the reactor causes non-uniform deposition of carbon or coke upon the particles and non-uniform conversion of the reactant charge. The cracking efficiency is materially reduced from that which is obtained when the gas flows uniformly through the bed. Channelling in the regenerator causes the overheating of some of the particles with consequent damage and loss of catalytic activity. Other particles in the bed are not sufficiently regenerated to regain their former cracking activity. In order to provide uniform gas flow and prevent channelling, it is desirable to utilize catalyst particles of generally uniform size and shape, although some irregularity of size of particles is tolerable. For example, they may take the form of pellets, pills, uniform granules and spheres, spheres or beads being preferred. The term "granular" when used in this specification refers broadly to all solid particles of the size range indicated, whether regular or irregular in size or shape. The particle size may range from about 3–100 mesh Tyler Screen Analysis; but is preferably 4–12 mesh Tyler. The catalytic material may be natural or treated clays such as bentonite, montmorillonite or kaolin or may take the nature of certain synthetic associations of silica, alumina, chromia, silica and alumina, chromia and alumina, etc., with or without various additional metallic oxides. The particles may also be formed of inert materials such as, for example, mullite or corhart. These materials are well known in the petroleum and related arts, being produced in the form of hard refractory particles having enormous surface in relation to their small particle size. The particles have a density range of about 20–130 pounds per cu. ft., poured density. That is the density after the particles are merely poured into a receptacle and not packed.

The hardness of these particles ranges from about 60–100 hardness index broadly and preferably from about 80–100. The hardness index is determined by the following procedure:

*Clay catalyst.*—Screen a sufficient quantity of catalyst which has been tempered at 1050° F. for 3 hrs. in substantially dry air atmosphere to obtain 80–100 cc. of particles which pass through a Number 3 screen and remain on a Number 5 screen. Transfer 80±2 cc. of the particles to an attrition can containing eight steel balls. Rotate the can with its axis in a horizontal position at 80±2 R. P. M. for one hour by means of the roller equipment specified below. Remove the sample from the can and screen over a Number 6 screen, weighing the material retained on the screen to an accuracy of ±0.1 gram. The screenings are made by shaking for 10 minutes on a "Ro-tap" or "End-Shak" shaking machine using eight-inch test screens equipped with cover and pan.

Calculate the hardness index from the following formula:

$$\frac{\text{Weight on No. 6 screen} \times 100}{\text{Weight on No. 5 through No. 3 test sample}} = \text{hardness index}$$

Special apparatus required:
"Ro-tap" or "End Shak" screen shaker.
Eight inch nested standard testing screens including cover and pan which conform to A. S. T. M. designation: E 11–39.
Attrition can—3½ in. diameter by 3¾ in. long, friction fit lid. (i. e. 1 lb. standard grease can.)
Eight steel balls, smooth surface, 15/16 in. dia., 55±0.5 grams weight per ball.
Rotating machine adapted to rotate the can on its side, at 80±2 R. P. M.

*Synthetic catalyst modification of procedure*

*Tempering.*—For silica-alumina cracking catalyst, temper for 10 hrs. in substantially dry air atmosphere at 1400° F.
For chrome-silica-alumina cracking catalyst, temper for 3 hrs. in substantially dry air atmosphere at 1100° F.

*Size of sample.*—Use 80±2 cc. of particles which pass through a Number 3 screen and are retained on a Number 8 screen.

*Rolling.*—Same as for clay.

*Rolled sample.*—Screen over a Number 9 screen, weighing the material retained on the screen. The procedure followed is the same as for clay catalyst.

Hardness index =

$$\frac{\text{weight on No. 9 screen} \times 100}{\text{weight on No. 5 through No. 3 test sample}}$$

Channelling occurs in these systems, even though uniform sized particles are used, when catalyst or contact material attrition rates become excessive. Attrition involves the breaking or spalling of contact material particles, usually encountered when the particles impinge on the metal walls of the enclosed system or against themselves, producing much smaller particles called fines. Fines are caused also by the fact that the particles rub against each other or the metal walls in transit. If the amount of fines in the system builds up too high, a number of difficulties arise, such as, segregation or uneven distribution of fines in the beds which causes channelling, increase in pressure drop across the beds etc. Hence, catalyst attrition must be avoided or minimized in these moving bed systems.

Extensive efforts have been made in this art to develop suitable gas lifts to raise the particle-form contact material but the proposed systems were not commercially feasible because they produced excessive quantities of fines. It has recently been discovered that catalyst attrition can be materially reduced in these systems if the catalyst or particle velocity at the bottom and top of the lift pipe is maintained within certain critical limits. Suitable gas lifts, found commercially practical for use in these systems, are shown and claimed in copending applications for Letters Patents Serial Number 76,017, filed February 12, 1949, now Patent No. 2,666,731, and Serial Number 210,942, filed February 14, 1951. The purpose of this invention is to provide a method and apparatus for operating these lifts so as to effect minimum catalyst or contact material attrition.

The object of this invention is to provide an improved method and apparatus for feeding granular solid material into an upwardly extending lift passage for pneumatic transfer therethrough. A further object of this invention is to provide an apparatus for and a method of operating a gas lift at maximum horsepower efficiency.

A further object of this invention is to provide apparatus for and a method of operating a gas lift with minimum particle breakage.

These and other objects will be made more apparent by reference to the attached sketches, all highly diagrammatic in form, and the following detailed discussion.

Figure 1 shows a moving bed system incorporating a gas lift.

Figure 2 shows a more detailed sketch, partially in section, of the lower portion of a gas lift with the attendant gas introduction apparatus.

Figure 3 shows a calibration curve of Catalyst Circulation Rate versus Pressure Drop across the lift passage of the gas lift.

Figure 4 shows an alternate arrangement of the apparatus of the instant invention.

Referring now to Figure 1, the reactor 10 is shown superimposed over the kiln or reconditioner 11. Reactant hydrocarbons, in vapor, liquid or mixed form are introduced into the reactor 10 through the conduit 12 and converted products are removed from the vessel through the conduit 13. The particles gravitate downwardly through the vessel as a substantially compact mass, at an elevated temperature, about 800–1100° F., and elevated pressure, about 5–30 p. s. i. (gauge). The particles of contact material are purged in the bottom of the vessel by an inert gas, such as flue gas or steam, introduced through the conduit 14, prior to their withdrawal from the bottom of the vessel.

The spent or coked catalyst particles are introduced into a depressurizer 15 through the conduit 16, where the gas pressure is substantially relieved. The gas is withdrawn from this vessel through the conduit 17 to discharge. The depressurized catalyst is introduced into the top of the kiln 11 through the conduit 18.

Inert gas is introduced into the top of the kiln through the conduit 19 to prevent combustion supporting gases from rising up through the continuous catalyst column. Combustion supporting gas, such as air, is introduced into the vessel 11 through the conduit 20 to travel both upward and downward through the bed while burning the coke deposits on the surface of the particles. The flue gas formed thereby is removed through the conduits 21, 22 to an exhaust stack, not shown. The kiln is generally operated at a low pressure, for example, about 1 p. s. i. (gauge), although much higher pressures can be used. The temperature in the kiln is maintained between about 1000–1300° F. Cooling coils are provided in the vessel for temperature adjustment. Temperatures much above 1300° F. heat damage the catalyst and are to be avoided. When inerts are used as the contact material, however, this limitation does not apply, and materially higher burning temperatures can be used. The particles withdrawn from the kiln are purged by an inert gas introduced through the conduit 23.

The regenerated granular contact material is gravitated through the conduit 24 to a vent chamber 25 where inert gas is removed. The granular particles are then gravitated downwardly through the conduit 26 into the top of the lift tank 27. The lift tank 27 is located at the bottom of the lift pipe 28 and the separator 29 is located at the top. The open-ended lift pipe is terminated intermediate the top and bottom of both vessels. The lower end of the pipe is located far enough below the top of the lift tank so that the granular material introduced into the tank through the conduit 26 forms a substantially compact bed thereabout. Lift gas is introduced through the conduit 30 into the tank in sufficient amount to suspend and lift the particles up the pipe to the separator.

The gas and granular particles are separated in the separator. The gas is discharged through the conduit 31 and the particles are withdrawn in substantially compact column form through the conduit 32. Inasmuch as there is generally a substantial difference in pressure between the vessels 29 and 10, the feed leg 32 must be sufficiently long to provide a gas seal. A suitable feed leg is shown and claimed in the copending application for U. S. patent, Serial Number 108,828, filed August 5, 1949, or U. S. Patent No. 2,410,309, issued October 29, 1946. The problem arises also in connection with feeding the contact material into the lift tank 27 through the conduit 26. A similar feed leg can be utilized at that location.

The particular apparatus features of this invention are shown on Figure 2. Lift gas is drawn through the conduit 40 by the blower 41. The blower 41 is driven by the steam turbine 42 to which it is directly connected. The steam is supplied through the conduit 43 and discharged through a drain not shown. The lift gas is discharged from the blower 41 through the conduit 44 to the heater 45. Fuel is supplied to the heater 45 to heat the lift gas to the temperature of the contact material or thereabouts through the conduit 46. The gas discharged from the heater is split into two streams by the primary and secondary gas passageways 47, 48. The lift tank 27 is shown partly in section. The baffle 49 is arranged around the lower end of the lift pipe to provide an annular portion of catalyst bed between the baffle and the lift pipe. The primary gas passageway 47 is terminated in the tank 27 just below the lift pipe 28, so as to permit the gas to pass up the pipe without passing through any substantial thickness of the contact bed. The secondary gas passageway is terminated behind the baffle. The baffle is positioned to direct the secondary gas into the bed at locations substantially displaced from the lower end of the lift pipe, so as to pass through the intervening bed before passing up the pipe. The secondary gas pushes the catalyst in the intervening portion into the primary gas stream where it is suspended and lifted up the pipe. Suitable lift tanks are shown in more detail in a copending application for Letters Patent, Serial Number 211,258 filed February 16, 1951.

In general, the catalyst velocity and gas velocity in the lift for smooth lifting will depend, to some extent, upon the physical dimensions of the lift, as is more fully disclosed in companion case Serial Number 210,942, filed February 14, 1951. Broadly the wide range of the catalyst equilibrium velocity is about 5–300 ft. per sec., whereas a practical range for commercial use is about 5–75 ft. per sec. The catalyst equilibrium velocity is the difference between the gas actual linear velocity, at any given location in the lift pipe, and the catalyst terminal velocity. The catalyst terminal velocity depends on the catalyst density, form and shape, and upon the particular lift gas or gases and also the temperature and pressure conditions involved. The catalyst terminal velocity for any given condition can be calculated from equational relationships or estimated from data which are available in the public literature. It may also be determined by routine experimental methods, well known in the art. The values of catalyst equilibrium velocities referred to herein are those in the lower portion of the lift pipe. For a small lift about 40 ft. tall and 3 inches inside diameter, the catalyst equilibrium velocity may range from about 5–50 ft./sec., whereas for a large lift about 200 ft. tall and 17 inches inside diameter, the catalyst equilibrium velocity may range from about 35–75 ft./sec. In general, the gas velocity will range from about 30–150 ft./sec., being about 30–120 ft./sec. for a small or short lift and 70–150 ft./sec. for the large or long lift, previously described. Failure to maintain the velocity in the ranges indicated above for the bottom of the lift pipe will result in surging in the pipe, excessive pressure drop across the pipe, high attrition in the pipe, and low power efficiency in the lift.

Prior art gas lifts developed a substantial pressure drop across the lift pipe. This caused a large increase in gas velocity during its transfer through the pipe, with a consequent increase in particle velocity. The particles shot out of the top of the pipe and impinged on the metal walls of the receiving vessel with considerable force, causing excessive particle breakage. The particles travelled a substantial distance upward before falling back onto the bed of contact material near the top of the lift. Because of the large drop they gained sufficient velocity to hit the bed with considerable force, causing excessive breakage. It has been discovered that by controlling the upward velocity of the particles so that they are discharged from the top of the pipe at less than 35 ft./sec., and preferably from 15–25 ft./sec., this breakage of the catalyst is substantially reduced. This can be effected in several ways, one being by using a tapered lift pipe, as shown in copending application for Letters Patent, Serial Number 210,942, filed February 14, 1951, or by withdrawing gas along the pipe as shown in application for Letters Patent, Serial Number 211,344, filed February 16, 1951.

As indicated, the lift can be designed so that when the proper lift gas velocity at the top is established, the proper velocity conditions at the bottom and middle of the pipe will automatically exist. The correct top gas velocity is dependent upon the lift gas rate, catalyst particle size and catalyst poured density, and the temperature of the air and catalyst at the top of lift pipe. It is essential to maintain the top gas velocity above an average critical minimum velocity. Below this average minimum velocity the catalyst is not elevated smoothly as surging exists in the lift pipe. This results in high attrition, and an increase in bottom pressure due to the increase in density of the catalyst stream when the air and catalyst velocities are too low. The correct top velocity is somewhat above this surging velocity but not above about 14 per cent higher than this minimum value, as above this maximum velocity catalyst attrition increases noticeably. Gas and catalyst velocities referred to herein are all average velocities inasmuch as the actual velocities involved may cover a substantial range from a maximum to a minimum value.

In order to maintain the gas velocity at the top of the lift within the required range a flow measuring device 50 is connected in the conduit 40 on the suction side of blower 41 to develop a signal which actuates the flow rate controller 51 connected to a valve 52 in the primary gas passageway. When the flow measuring device indicate a change in gas flow, the controller operates the valve 52 to return the flow to the desired rate. It has been discovered that the control is smoother when the pressure of the gas delivered to the heater is maintained substantially constant. A pressure tap 53 in line 44 is connected to the pressure controller 54 which controls valve 55 in the steam line to the turbine. A change in pressure in the conduit 44 causes the controller to readjust the valve 55 which changes the speed of the turbine and blower. The pressure is, therefore, maintained substantially constant.

As indicated, one of the factors controlling the top gas velocity is gas temperature. In order to obtain effective control this should be constant. Hence, a temperature controller 56 is connected to a temperature tap 57 in the stream of gas discharged from the heater and operatively connected to the automatic valve 58 in the fuel line 46. The temperature tap could be located at other places than shown on Figure 2, for example, the top of the lift pipe. The catalyst is delivered to the lift tank at a substantially constant temperature. If the lift gas is delivered to the lift tank at a substantially lower temperature than that of the catalyst, the gas velocity will be increased in the lift pipe because of heat exchange between the hot catalyst and cooler gas. This is avoided by heating the lift gas to a temperature not substantially below that of the hot catalyst, thereby minimizing heat exchange between the lift gas and hot catalyst during transfer through the lift pipe. Since the catalyst is supplied to the lift tank at a substantially constant temperature and the lift gas temperature is maintained substantially constant, variable rates of heat transfer in the lift pipe between the catalyst and lift gas, which would result in variable catalyst discharge velocity from the lift pipe, are avoided.

The catalyst flow rate is directly related to the pressure at the bottom of the lift pipe. The catalyst flow rate is maintained constant by connecting a pressure tap 61 in the primary gas inlet duct to a pressure controller 62, used to operate the automatic valve 63 in the secondary gas passageway 48. This is essential in these systems because all the operating variables of the system are interrelated. For example, when the space velocity, temperature, pressures, and catalyst circulation rate of the system are determined, for a given crude charge, they must be maintained substantially constant. As indicated on Figure 1, there is a continuous unobstructed column of catalyst from the separator down through the vessels to the lift tank. The only flow control is obtained by control of the secondary gas valve 63. This is denominated "single point flow control." When a different catalyst flow rate is required, the pressure controller 62 can be reset, changing the gas flow rate through the secondary gas passageway. However, the flow rate controller 51 will automatically readjust valve 52 to maintain the total gas flow through the lift pipe at optimum operating conditions. The primary lift gas stream is generally about 85–95 per cent of the total gas flow, whereas the secondary gas stream comprises the remainder, about 5–15 per cent of the total.

Figure 3 shows a typical calibration curve of gas lift 200 ft. tall, illustrating the direct relationship between the pressure drop across the lift passage and the catalyst circulation rate.

An alternate arrangement of the apparatus of this invention found satisfactory for commercial cracking systems is shown in Figure 4. Since the flow of secondary air is only about ten per cent of the total flow, the heater can be placed in the primary line. As indicated, air is introduced through the downcomer 70 into the blower 71. The blower is driven by the motor 72. The motor speed is controlled by the pressure controller 73 to maintain a substantially constant pressure in the discharge conduit 74. The secondary gas is taken from this conduit through the conduit 75 to the lift tank 76. The conduit 77 conducts the primary gas to the heater 78. The heated gas is passed through the conduit 79 to the lift tank to lift the contact material up the lift pipe 80. The conduit 79 is made short and free of restricting walls or surfaces in its interior. This avoids the development of turbulent conditions which sometimes arise in long pipes containing valves and side stream outlets. Outside of these differences, the operation is similar to that described with reference to Figure 2.

*Example No. 1*

A gas lift was operated commercially incorporated in a 15,000 bbl. per stream day moving bed system. The lift pipe was tapered, 237 feet long and 25.6 in. internal diameter at the bottom. The catalyst was silica-alumina-chromia beads, about ⅛ in. particle diameter and about 85 hardness index. The circulation rate was 350 tons per hour. The lift gas was air. Using the gas controls shown on Figure 2, smooth operation was obtained at the following conditions:

| | |
|---|---|
| Top lift temperature (air and catalyst) | 1040° F. |
| Bottom catalyst temperature | 1050° F. |
| Bottom air temperature | 950° F. |
| Air rate at blower | 12000 S. C. F. M. |
| Pressure at bottom of lift pipe | 2.0 p. s. i. g. |
| Lift gas pressure before throttling | 2.9 |

I claim:
1. An improved method for feeding granular solid material into an upwardly extending lift passage through which it is lifted by a lift gas to an elevated receiving zone which comprises, maintaining a substantially compact bed of said solid material surrounding the lower end of said lift passage and in communication with the interior of said passage along the downwardly facing lower end of the passage, introducing a lift gas into an enclosed region, withdrawing a primary and a secondary stream of gas from said region, measuring the flow of gas to said region and adjusting the flow rate of the primary stream in response to the measurement, so as to keep the flow of gas to said region substantially constant, supplying the primary gas to the lower end of said lift passage without causing said gas to flow through any substantial thickness of said bed surrounding the lower end of said lift passage, introducing the secondary stream of lift gas into said bed at at least one point positioned a substantial distance away from the lower end of said passage, so as to pass through an intervening portion of the bed, and adjustably controlling the flow rate of the secondary gas stream, to effect upward transfer of the solid material at the desired rate.

2. An improved method for feeding granular solid material into an upwardly extending lift passage through which it is lifted by a lift gas to an elevated receiving zone which comprises, maintaining a substantially compact bed of said solid material surrounding the lower end of said lift passage and in communication with the interior of said passage along the downwardly facing lower end of the passage, introducing a lift gas into an enclosed region, withdrawing a primary and a secondary stream of gas from said region, measuring the flow of gas to said region and adjusting the flow rate of the primary stream in response to the measurement, so as to keep the flow of gas to said region substantially constant, supplying the primary gas to the lower end of said lift passage without causing said gas to flow through any substantial thickness of said bed surrounding the lower end of said lift passage, introducing the secondary stream of lift gas into said bed at at least one point positioned a substantial distance away from the lower end of said passage, so as to pass through an intervening portion of the bed, measuring the pressure at the bottom of said passage and adjusting the flow rate of the secondary stream in response to the measurement, whereby a substantially constant flow of the contact material is pushed into the primary stream of lift gas and lifted, suspended in the gas mixture, to the receiving zone.

3. An improved method for feeding granular solid material into an upwardly extending lift passage through which it is lifted by a lift gas to an elevated receiving zone which comprises, maintaining a substantially compact bed of said solid material surrounding the lower end of said lift passage and in communication with the interior of said passage along the downwardly facing lower end of the passage, introducing a lift gas into an enclosed region, maintaining the pressure in said region substantially constant, withdrawing a primary and a secondary stream of gas from said region, measuring the flow of gas to said region and adjusting the flow rate of the primary stream in response to the measurement, so as to keep the flow of gas to said region substantially constant, supplying the primary gas to the lower end of said lift passage without causing said gas to flow through any substantial thickness of said bed surrounding the lower end of said lift passage, introducing the secondary stream of lift gas into said bed at at least one point positioned a substantial distance away from the lower end of said passage, so as to pass through an intervening portion of the bed, measuring the pressure of the primary gas stream entering the bottom of said passage and adjusting the flow rate of the secondary stream in response to the measurement, whereby a substantially constant flow of the contact material is pushed into the primary stream of lift gas and lifted, suspended in the gas mixture, to the receiving zone.

4. An improved method for feeding granular solid material into an upwardly extending lift passage through which it is lifted by a lift gas to an elevated receiving zone which comprises, maintaining a substantially compact bed of said solid material surrounding the lower end of said lift passage and in communication wtih the interior of said passage along the downwardly facing lower end of the passage, introducing a lift gas into an enclosed region at an advanced pressure, maintaining the pressure in said region substantially constant, withdrawing a primary and a secondary stream from said region, measuring the flow of gas to said region and adjusting the flow rate of the primary stream in response to the measurement, so as to keep the flow of gas to said region substantially constant, supplying the primary gas to the lower end of said lift passage without causing said gas to flow through any substantial thickness of said bed surrounding the lower end of said lift passage, introducing the secondary stream of lift gas into said bed at at least one point positioned a substantial distance away from the lower end of said passage, so as to pass through an intervening portion of said bed, measuring the pressure at the bottom of said passage and adjusting the flow rate of the secondary stream in response to the measurement, whereby a substantially constant flow of the contact material is pushed into the primary stream of lift gas and lifted suspended in the gas mixture to the receiving zone.

5. In a moving bed conversion system in which a solid contact material is gravitated through conversion and reconditioning zones in substantially compact column form wherein it is contacted separately with reactant fluids and reconditioning gas and the hot contact material is pneumatically transferred upward through a confined passage to complete an enclosed cyclic path, the improved method of feeding the solid material into the lift passage which comprises: maintaining a substantially compact bed of said solid material surrounding the lower end of said lift passage and in communication with the interior of said passage along the downwardly facing lower end of the passage, introducing a lift gas into an enclosed region at an advanced pressure, maintaining the pressure in said region substantially constant, supplying heat to said gas in said region, withdrawing a primary and a secondary stream from said region, measuring the flow of gas to said region and adjusting the flow rate of the primary stream in response to the measurement, so as to keep the flow of gas to said region substantially constant, supplying the primary gas to the lower end of said lift passage without causing said gas to flow through any substantial thickness of said bed, introducing the secondary stream of lift gas into said bed at at least one point positioned a substantial distance away from the lower end of said passage, so as to pass through an intervening portion of said bed, measuring the pressure of the lift gas near the bottom of the passage and adjusting the flow rate of the secondary stream in response to the measurement, in order to supply a substantially constant stream of the contact material to the primary stream of lift gas to be suspended therein and lifted up the passage and adjusting the amount of heat added to said lift gas in said region to maintain the discharge temperature of the gas therefrom substantially constant, whereby the upward velocity of the contact material at the top of the confined passage is maintained substantially constant.

6. In a moving bed conversion system in which a solid contact material is gravitated through conversion and reconditioning zones in substantially compact column form wherein it is contacted separately with reactant fluids and reconditioning gas and the hot contact material is pneumatically transferred upward through a confined passage to complete an enclosed cyclic path, the improved method of feeding the solid material into the lift passage which comprises: maintaining a substantially compact bed of said solid material surrounding the lower end of said lift passage and in communication with the interior of said passage along the downwardly facing lower end of the passage, introducing a lift gas into an enclosed region at an advanced pressure, maintaining the pressure in said region substantially constant, withdrawing a primary and a secondary stream of gas from said region, measuring the flow of gas to said region and adjusting the flow rate of the primary stream in response to the measurement, so as to keep the flow of gas to said region substantially constant, supplying the primary gas to a heating zone, heating the gas in said zone, and supplying the heated gas to the lower end of said lift passage without causing said gas to flow through any substantial thickness of said bed, introducing the secondary stream of lift gas into said bed at at least one point positioned a substantial distance away from the lower end of said passage, so as to pass through an intervening portion of said bed, measuring the pressure of the lift gas near the bottom of the passage and adjusting the flow rate of the secondary stream in response to the measurement, in order to supply a substantially constant stream of the contact material to the primary stream of the lift gas to be suspended therein and lifted up the passage and adjusting the amount of heat added to said primary gas stream to maintain the discharge temperature of the gas therefrom substantially constant, whereby the upward velocity of the contact material at the top of the confined passage is maintained substantially constant.

7. Apparatus for feeding a constant flow of solid contact material smoothly into the lower end of an upwardly directed gas lift comprising in combination: a lift tank at the bottom of the pipe, the lower end of the pipe terminated intermediate the top and bottom of the tank, conduit means for feeding contact material into the tank to form a bed of contact material about the lower end of the pipe, gas conduit means through which a lift gas is passed, said means branched at one end to provide a primary gas passageway and a secondary gas passageway, means for measuring gas flow through said gas conduit means, a flow controller operated by said measuring means, and a valve in said primary gas passageway controlled by said flow controller, so as to maintain a substantially constant gas flow through said conduit means, said primary gas passageway terminated within said lift tank just below the lift pipe, so as to introduce gas into said lift pipe directly without passage through any substantial thickness of the bed in said lift tank, said secondary gas passageway terminated at at least one location in said lift tank a spaced distance away from the bottom of said lift pipe, so as to leave an intervening bed of the solid material therebetween, and valve means in said secondary passageway, adapted to control the rate at which contact material is introduced into the lower end of the lift pipe.

8. In a moving bed conversion system, improved apparatus for insuring smooth conveyance of the contact material upwardly through a gas lift pipe which comprises in combination: a lift tank at the bottom of the pipe, the lower end of the pipe terminated intermediate the top and bottom of the tank, conduit means for feeding contact material into the tank to form a bed of contact material about the lower end of the pipe, gas conduit means through which a lift gas is passed, said means branched at one end to provide a primary gas passageway and a secondary gas passageway, means for measuring gas flow through said gas conduit means, a flow controller operated by said measuring means, and a valve in said primary gas passageway controlled by said flow controller, so as to maintain a substantially constant gas flow through said gas conduit means, said primary gas passageway terminated within said lift tank just below the lift pipe, so as to introduce gas into said lift pipe directly without passage through any substantial thickness of the bed in said lift tank, said secondary gas passageway terminated at at least one location in said lift tank a spaced distance away from the bottom of said lift pipe, so as to leave an intervening bed of the solid material therebetween, a pressure controller responsive to the pressure at the bottom of the lift pipe, a valve in said secondary gas passageway, adapted to be controlled by said pressure controller, so as to supply a substantially constant flow of contact material into the lower end of said lift pipe.

9. In a moving bed conversion system, improved apparatus for insuring smooth conveyance of the contact material upwardly through a gas lift pipe which comprises in combination: a lift tank at the bottom of the pipe, the lower end of the pipe terminated intermediate the top and bottom of the tank, a conduit attached to the top of the tank, adapted to feed contact material into the tank to form a bed of contact material about the lower end of the pipe, an enclosed chamber, means for supplying a stream of lift gas to said chamber, means for maintaining the gas pressure in said chamber substantially constant, conduit means for supplying a primary stream of lift gas from said chamber to a location just below the lower open end of the lift pipe, so that the gas passes up the pipe without passing through any substantial thickness of the contact material bed in the lift tank, flow measuring means adapted to measure the flow of gas delivered to said chamber, a flow controller attached to said means, a valve in said conduit means carrying primary gas, operated by said flow controller so as to maintain the gas flow to said chamber substantially constant, conduit means for supplying a secondary stream of lift gas from said chamber to said lift tank, terminated at at least one location a spaced distance away from the bottom of the pipe, so as to pass gas through at least a substantial thickness of intervening bed, a pressure controller responsive to the pressure of the lift gas at the bottom of the lift pipe, a valve in said conduit means carrying secondary gas, operated by said pressure controller, so as to feed contact material to the lower end of the lift pipe at a substantially constant flow rate.

10. In a moving bed conversion system, improved apparatus for feeding lift gas to the bottom of a gas lift pipe which comprises in combination: a lift tank at the bottom of the pipe, the lower end of the pipe terminated intermediate the top and bottom of the tank, conduit means for feeding contact material into the tank to form a bed of contact material about the lower end of the pipe, a blower, an inlet conduit attached to said blower, means for measuring gas flow through said inlet conduit, an outlet conduit attached to said blower, a heater attached to said outlet conduit, a pressure tap in said outlet conduit, a pressure controller attached to said tap, and means operable in response to said controller to adjust the speed of the blower, so as to maintain the gas pressure constant in the outlet conduit, a primary gas pipe connecting said heater and said lift tank, said pipe terminated just below the said lift pipe, so as to introduce gas into the pipe without passage through any substantial thickness of the contact material bed, a valve in said primary gas pipe, a controller adapted to regulate said valve operable in response to flow measurements of the flow measuring means, so as to maintain the gas flow to the heater substantially constant, a secondary gas pipe connecting said heater and said lift tank, said pipe terminated at at least one location in said lift tank a substantial distance away from the lower end of said lift pipe, so as to leave an intervening bed of contact material therebetween, a valve in said secondary gas pipe, a controller adapted to regulate said valve, a pressure tap connected in said primary gas pipe near said lift tank responsive to the gas pressure at the bottom of the lift pipe, means connecting the pressure tap to the controller, so as to provide an operating pressure, whereby the flow of contact material into the lower end of the lift pipe is maintained substantially constant, a fuel pipe attached to said heater, a valve in said fuel pipe, a tap adapted to indicate the temperature of the gas discharged from said heater, a controller adapted to operate said fuel valve in response to the gas temperature measured by the temperature tap, whereby the gas is discharged from the top of the lift pipe at a substantially constant velocity.

References Cited in the file of this patent

UNITED STATES PATENTS

| | | |
|---|---|---|
| 2,180,379 | Whitfield | Nov. 21, 1939 |
| 2,271,148 | Becker | Jan. 27, 1942 |
| 2,289,329 | Prickett | July 7, 1942 |
| 2,404,937 | Anderson | July 30, 1946 |
| 2,429,359 | Kassel | Oct. 21, 1947 |
| 2,433,726 | Angell | Dec. 30, 1947 |
| 2,439,721 | Dickey | Apr. 13, 1948 |
| 2,509,983 | Morrow | May 30, 1950 |
| 2,541,077 | Leffer | Feb. 13, 1951 |
| 2,561,771 | Ardern | July 24, 1951 |
| 2,666,731 | Bergstrom | Jan. 19, 1954 |
| 2,676,142 | Crowley | Apr. 20, 1954 |

FOREIGN PATENTS

| | | |
|---|---|---|
| 7,075 | Netherlands | Mar. 18, 1922 |